United States Patent [19]

Foerst

[11] 4,383,827
[45] May 17, 1983

[54] DRIVING SIMULATOR
[75] Inventor: Reiner Foerst, Gummersbach, Fed. Rep. of Germany
[73] Assignee: Dr.-Ing. Reiner Foerst GmbH, Marienheide, Fed. Rep. of Germany
[21] Appl. No.: 165,408
[22] Filed: Jul. 2, 1980
[30] Foreign Application Priority Data

Jul. 2, 1979 [DE] Fed. Rep. of Germany ....... 2926654

[51] Int. Cl.³ .............................................. G09B 9/04
[52] U.S. Cl. ......................................... 434/69; 434/71
[58] Field of Search ............................ 434/61, 62, 69; 358/104; 364/578; 340/725, 729; 273/29, 33, 34, 43, 71

[56] References Cited

U.S. PATENT DOCUMENTS

| | | | |
|---|---|---|---|
| 2,269,444 | 1/1942 | Durham et al. | 434/69 |
| 3,309,659 | 3/1967 | Balding | 434/43 |
| 3,515,802 | 6/1970 | Wise | 434/43 |
| 3,833,759 | 9/1974 | Yatabe | 434/69 |
| 4,034,484 | 7/1977 | Radice | 434/71 |
| 4,077,138 | 3/1978 | Foerst | 358/104 |
| 4,112,422 | 9/1978 | Mayer et al. | 273/DIG. 28 |
| 4,193,598 | 4/1982 | Freese | 273/DIG. 28 |
| 4,196,528 | 4/1980 | Foerst | 434/61 |
| 4,212,009 | 7/1980 | Aldeman et al. | 340/728 |
| 4,263,726 | 4/1981 | Bolton | 358/104 |

Primary Examiner—Vance Y. Hum
Assistant Examiner—Leo P. Picard
Attorney, Agent, or Firm—Becker & Becker, Inc.

[57] ABSTRACT

A device for simulating a ride of a road. The device comprises several range wedge generators, each of which generate two rows of spots on the screen of the monitor, meeting at the horizon and being symmetrical to the middle of the road; ceiling area pair generators, plate area pair generators, wall area pair generators for the representation of equidistant rectangular or nearly rectangular areas in the road picture; control devices for these area pair generators; random access memories which store the abscissas of these areas; rectangle generators; a write-read memory storing the abscissas of the middle of the road, line select signals and rectangle coordinates; a digital computer for the computation of the horizontal and vertical movement of the road picture; and a column-and-line-generator, several multipliers, a generator for select pulses, an object coordinate computer, and a partner behavior computer.

17 Claims, 23 Drawing Figures

DRIVING SIMULATOR

The present invention relates to a device for the simulation of a ride on a curved road using a screen of a monitor for the picture of the road perspectively observed by the driver, as well as using a program for the generation of the road picture, as well as using control devices such as accelerator pedal, brake pedal, clutch pedal, gearshift lever, and steering wheel, which devices influence the road picture, as well as using several light spot pair generators, means for generating a speed signal with a voltage-frequency converter supplying a base pulse, a speed proportional signal generator, a digital curve sequence generator, several standard curve function generators, a curve sequence program generator, means for determining the curvature of the road, the track angle and the parallel track position, a curvature function generator and a distance program generator, as well as using a device for signal combination, as well as using image generators for the front part of the vehicle according to U.S. Pat. No. 4,077,138—Foerst, issued Mar. 7, 1978, as well as using image generators for simulated partner vehicles according to U.S. Pat. No. 4,196,528—Foerst, issued Apr. 8, 1980.

Analog devices for the simulation of a car drive are already known. Their disadvantages are the necessity of tuning the components, the drifting of the integrators, the temperature behavior of the components, and the inaccuracy and relatively bad economy of the devices.

In U.S. Pat. No. 4,077,138, a driving simulator is described. In detail, its disadvantages are that the driving speed should not fall short of a certain minimum because of the drift of the integrators, that the view distance is strongly limited by economical reasons, that the curve functions are strongly limited by economical reasons, that the shape of the road cannot easily be changed, that no single objects with a complex shape can be represented, and that the device cannot easily be extended. Furthermore, the corresponding features of said patent compared to this invention have the following disadvantages: The videosignal generator for the road picture includes only light spot pair generators. Range lines cannot be represented. The light spot pairs are nothing but rectangles standing vertically and perpendicularly to the axis of the road. Analog time delay devices are necessary. Areas standing or lying longitudinally to the axis of the road cannot be represented. The speed proportional signal generator generates nothing but a light spot pair distance signal. Therefore, it is not suited for the direct feeding of a digital light spot control device. The light spot control device, the standard curve function generator, and the road curvature generator include analog evaluation matrices and integrators. Therefore, they are not suited for the feeding of a digital video signal generator.

Another analog driving simulator is described in U.S. Pat. No. 3,833,759—Yatabe, issued Sept. 3, 1974. It has the same disadvantages typical of analog devices. In U.S. Pat. No. 4,196,528, a device is described which already includes vehicle image generators. However, the object of this patent is the combination of several simulators, and the features of the vehicle image generators are not yet disclosed in detail.

Therefore, the object of this invention is to create a device which needs no tuning, which can be implemented economically by use of ordinary integrated circuits, which is suitable for large scale integrated circuits, by which a fine scanned or rastered, accurate, and complex TV-picture can be generated, which can be easily modified by exchange of components on sockets, which gives the possibility of natural-like representation of partner vehicles, and which can easily be extended.

In principle, this object is solved by:

a plurality of range wedge generators, each of which generates two rows of spots on the screen of the monitor meeting at the horizon and being symmetrical to the middle of the road and the intermediate wedge shaped area (range wedge) for the perspective figuring of two lines which are parallel to the middle of the road and the intermediate band (band shaped area) of the height h above earth level and of the width b, by adding and subtracting for every monitor line Y to a preset reference signal $X_h$ for the bottom point of the middle of the band which depends upon the track of the vehicle, the shape of the road, and the height of the band, a preset width signal, which is proportional to the line Y, a height factor $K_h$, and a width factor $K_b$, and by generating the intermediate values by logic comparison using the limiting values calculated in this way;

ceiling area pair generators for there representation of nearly rectangular areas $3_D$ which are parallel to the road plane and to the axis of the road;

plate area generators, for the representation of rectangular areas $3_T$ which are vertical to the road plane and perpendicular to the axis of the road;

wall area generators, for the representation of nearly rectangular areas $3_W$, which are vertical to the road plane and to the axis of the road;

a control device for these area pair generators for supplying line select signals Q for the positioning of the area pairs;

random access memories for the abscissas of the vertical rows for a certain number of lines, which store these abscissas as trunk abscissas until the next area pair appears;

a control device for the area pair generators for supplying ordinates for the horizontal line pairs as beam ordinates using the line select signals Q;

a device for the generation of the corresponding video signals by logically comparing the individual lines and areas being supplied by the range wedge generators;

rectangle generators for supplying the signals $X_R$ for the rectangular areas R and use as inputs the limiting values supplied by the control device for the area pair generators;

a write-read memory for storing the abscissas $X_h$ for the middle of the road, the line select signals Q, and the rectangle coordinates, which is written by the speed proportional signal generator by use of the digital computer and a buffer, and which is read by the video signal generator, whereby by use of a data selector for the writing process, the addresses Y are supplied from the speed proportional signal generator, and for the reading process the addresses are supplied by a current line signal $y_h$ which is generated in a column-and-line-generator and which is multiplied in a multiplier by a height factor $K_h$;

a multiplying device for supplying the width signals $X_b$, one input of which being the current line signal CY, the other a width factor;

a generator for select pulses sequentially supplying pulses for the selection of the individual X- and Y-values to the multiplier for the height presetting, to the multiplier for the width presetting, and to the video signal generator, according to the individual height and width factor of one range wedge;

an object coordinate computer for computing the object area coordinates by using stored constant values which characterize the shape and the size of an object; and a partner behavior computer for supplying the signals X of the parallel track position and z of the longitudinal position in the direction of the road for the computation of the position of the object on the screen.

According to this proposal, the basic approach disclosed in U.S. Pat. No. 4,077,138 is maintained. Specifically, the simplification is maintained, that the horizontal component of the ahead-movement is neglected. Concerning the implementation by use of digital components, an improvement is reached. Concerning the inclusion of continual lines, objects, and partner vehicles, as well as an automatic gear shift, an extension is reached.

The invention is illustrated in the accompanying drawings, in which.

Figure 1:
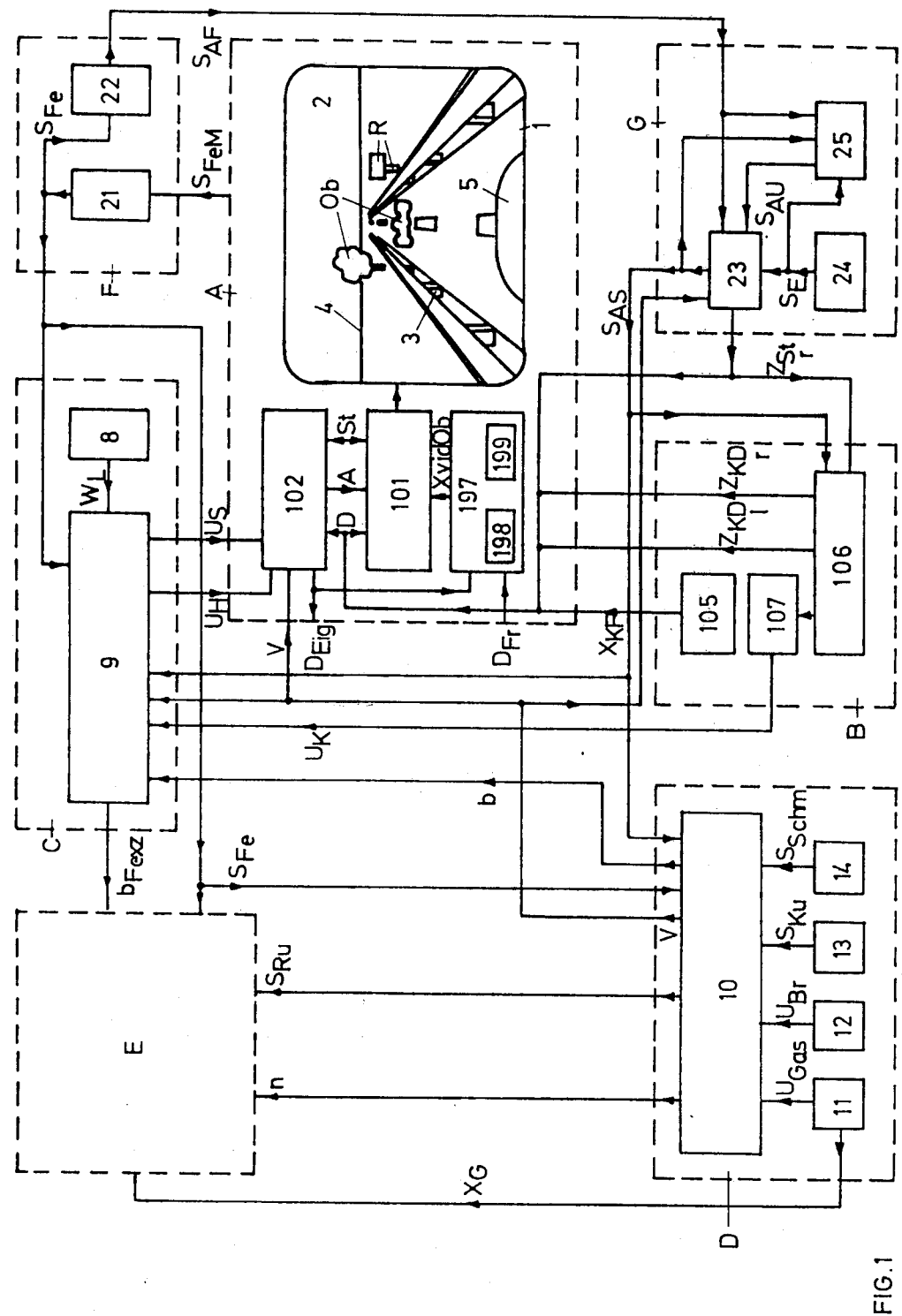
FIG. 1 is a survey of the driving simulator.
Figure 3:
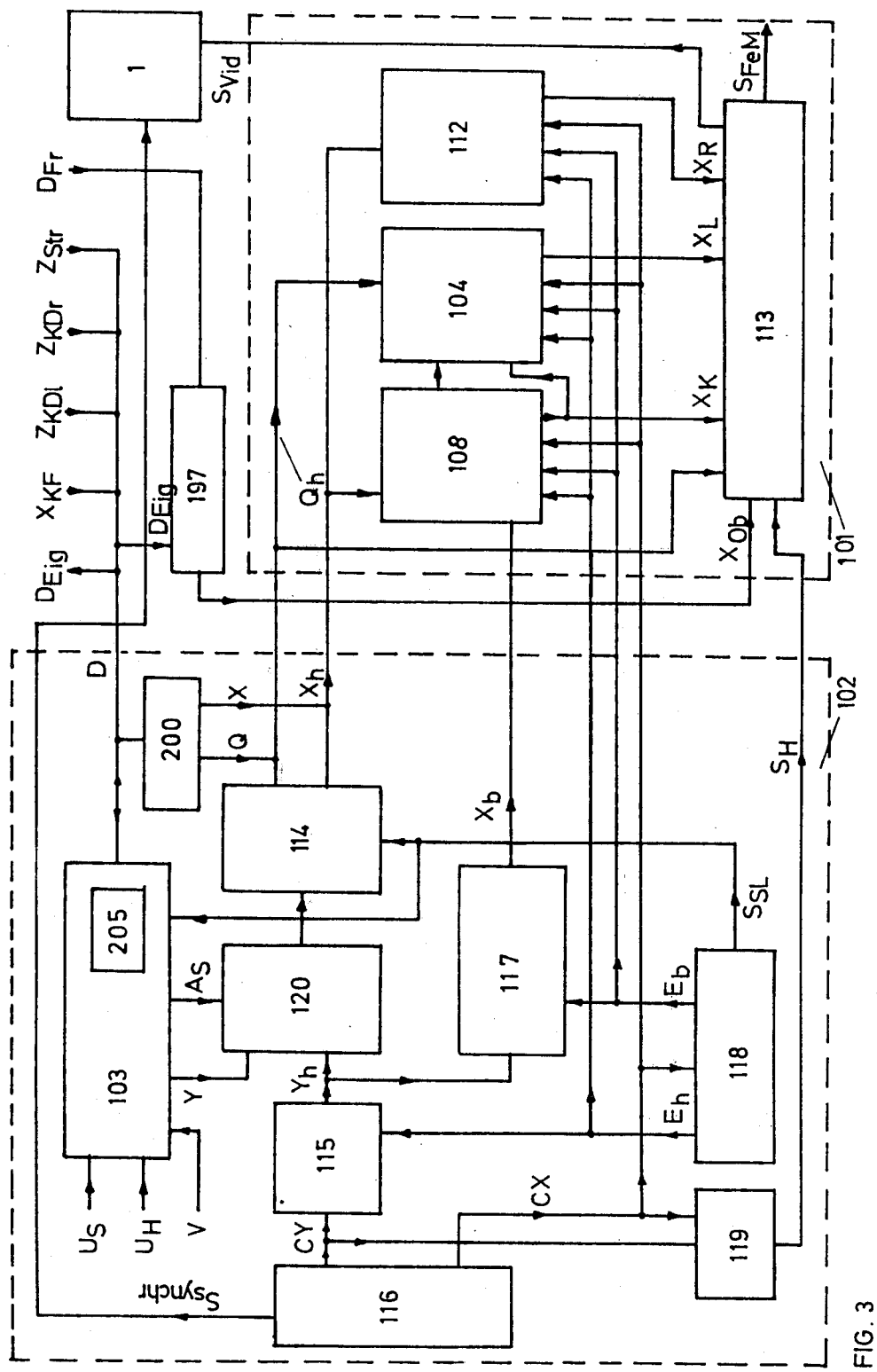
Figure 4:
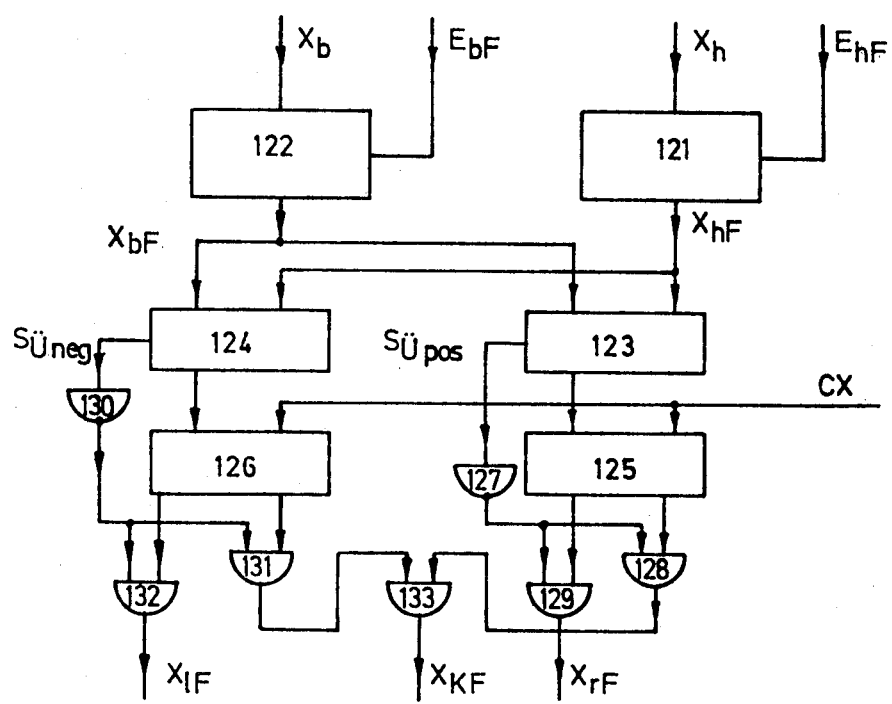
Figures 5A, 5B:
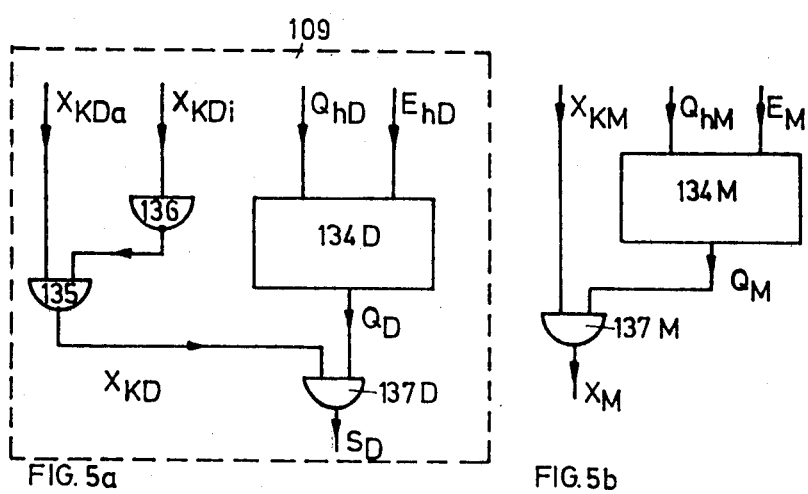
Figure 6:
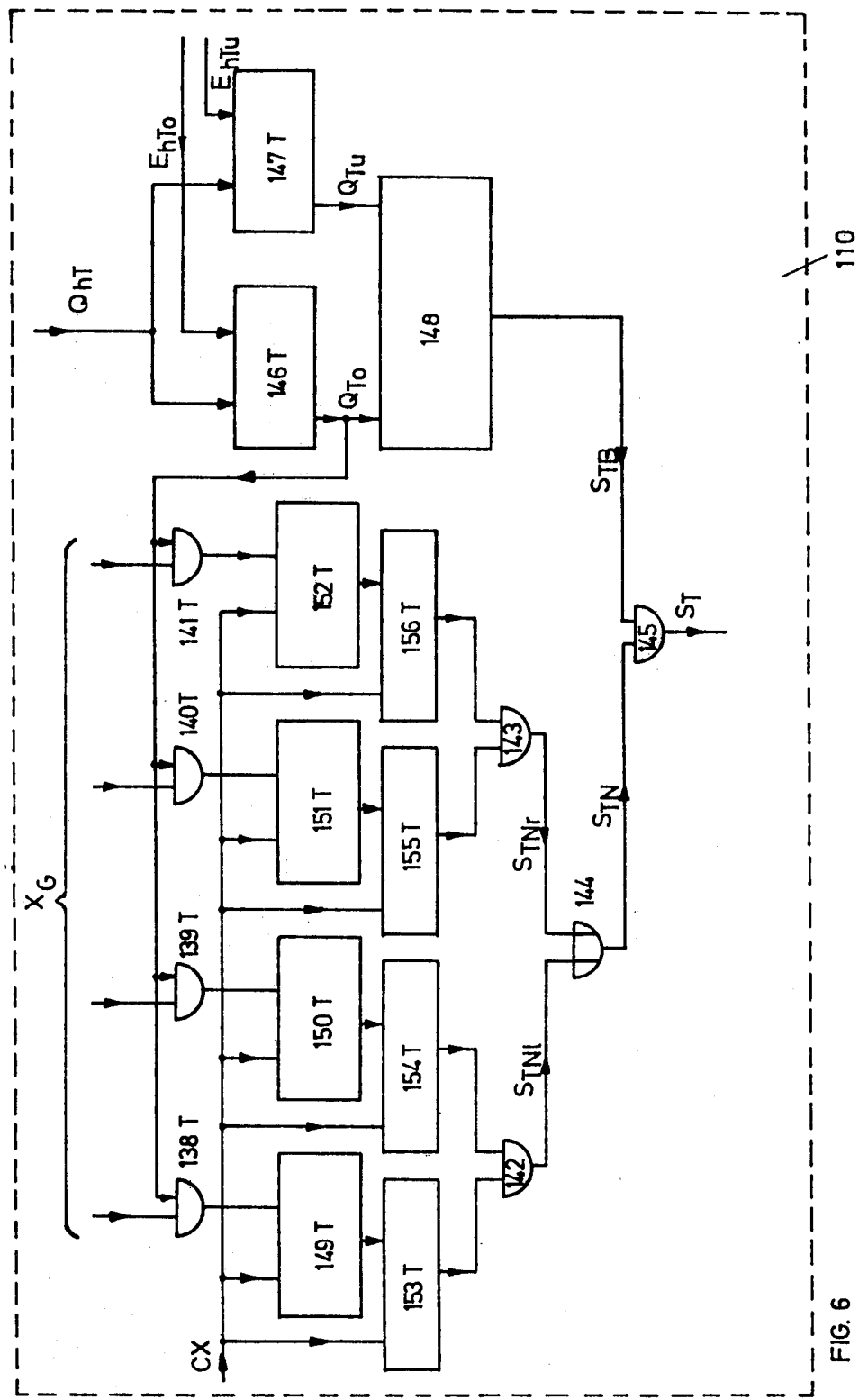
Figure 7:
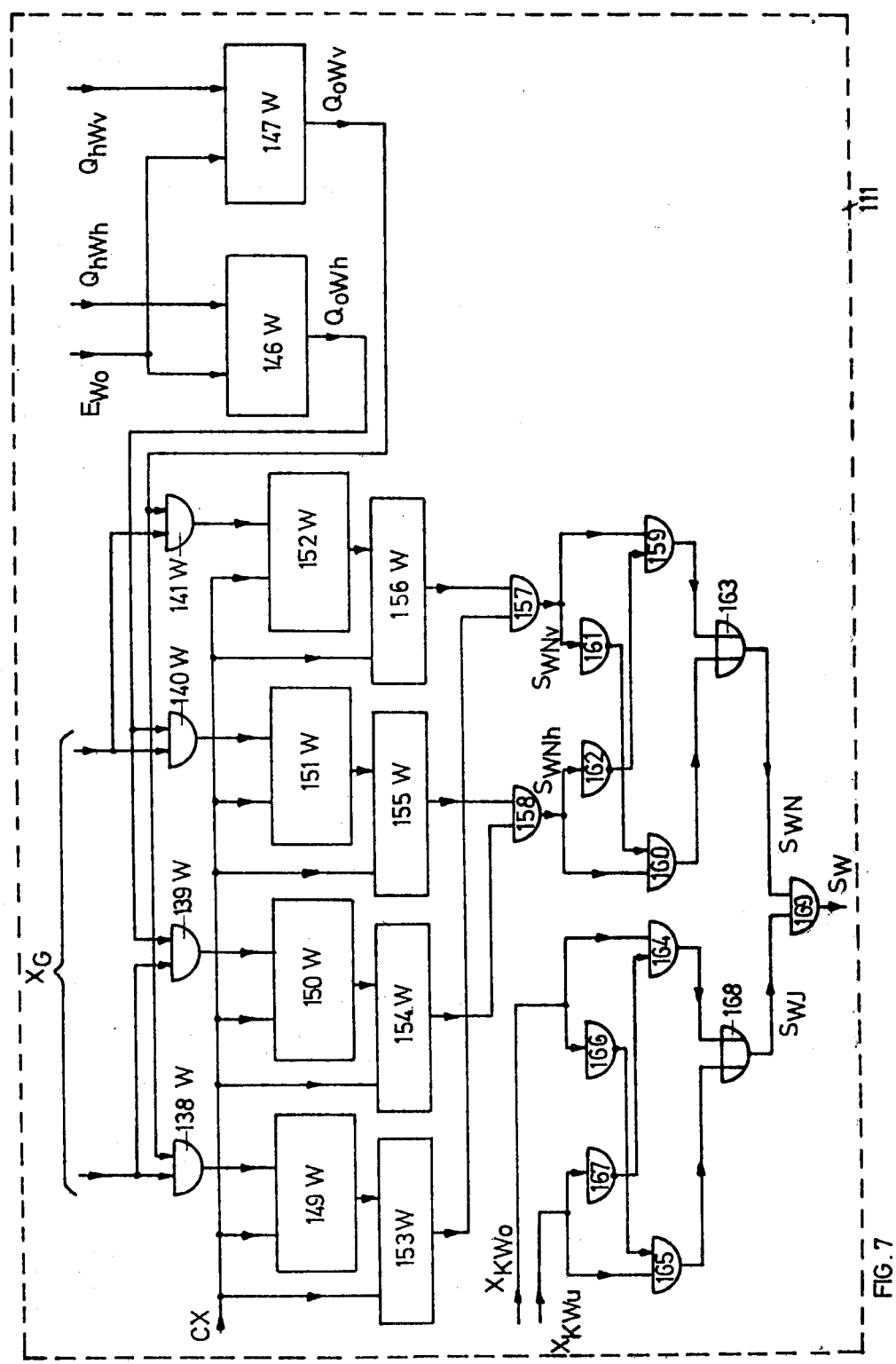
Figure 8:
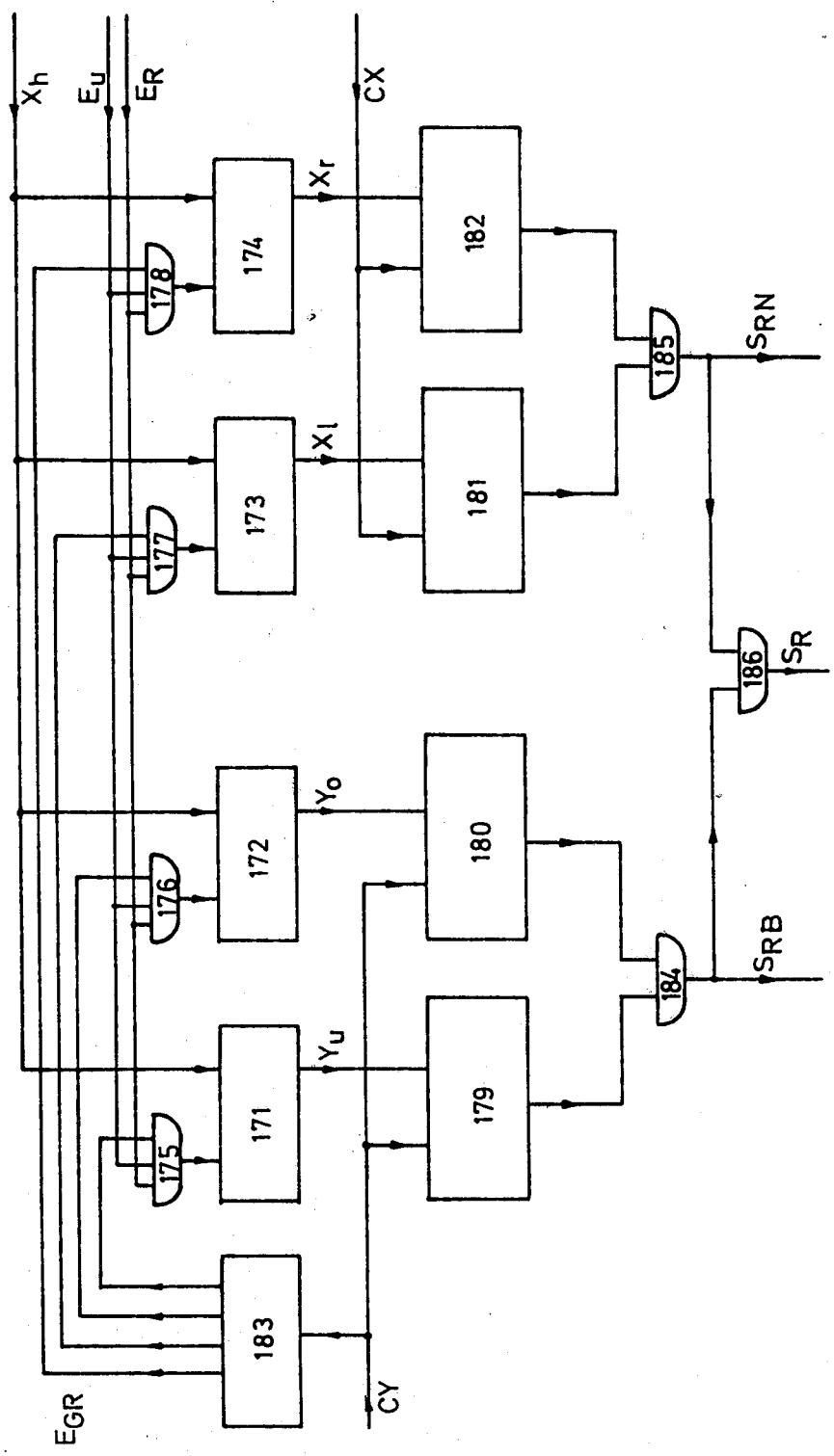
Figure 9:
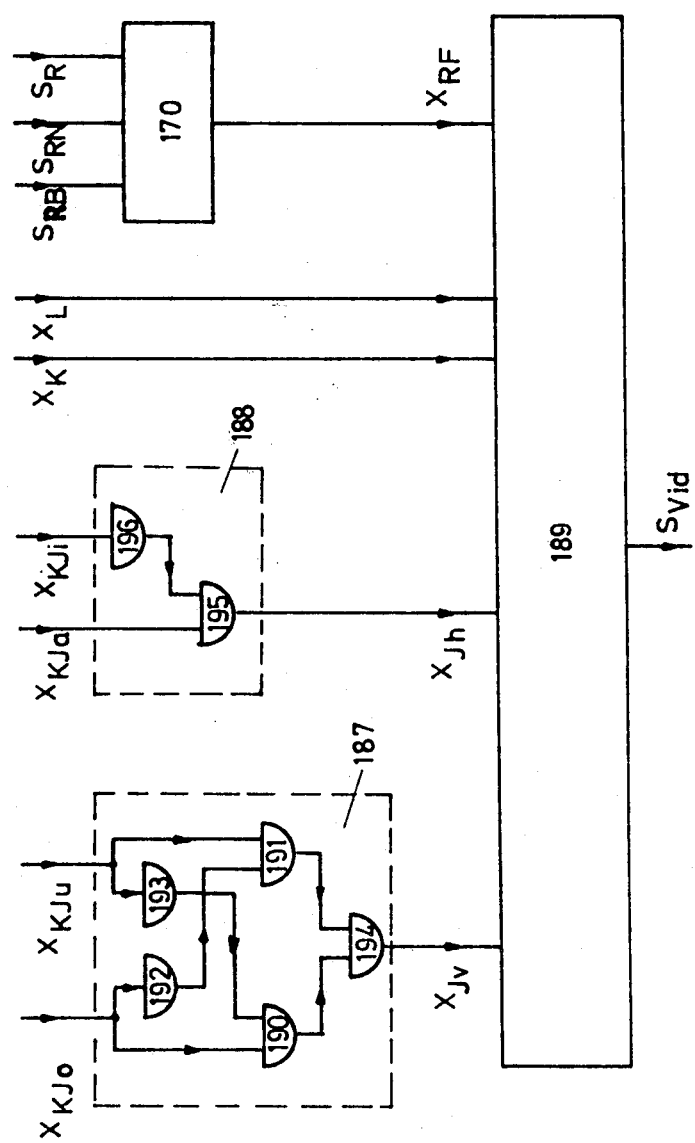
Figure 10A:
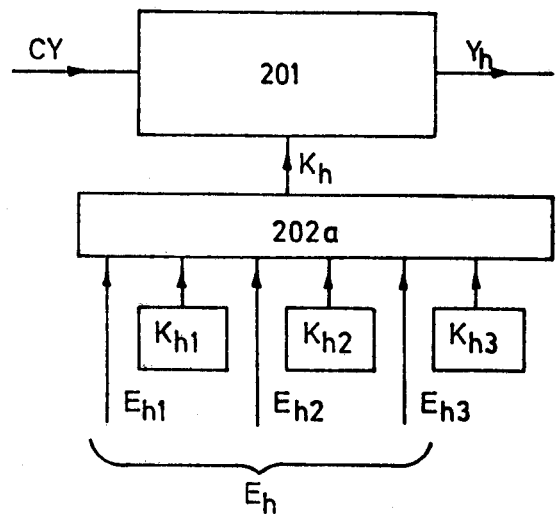
Figure 10B:
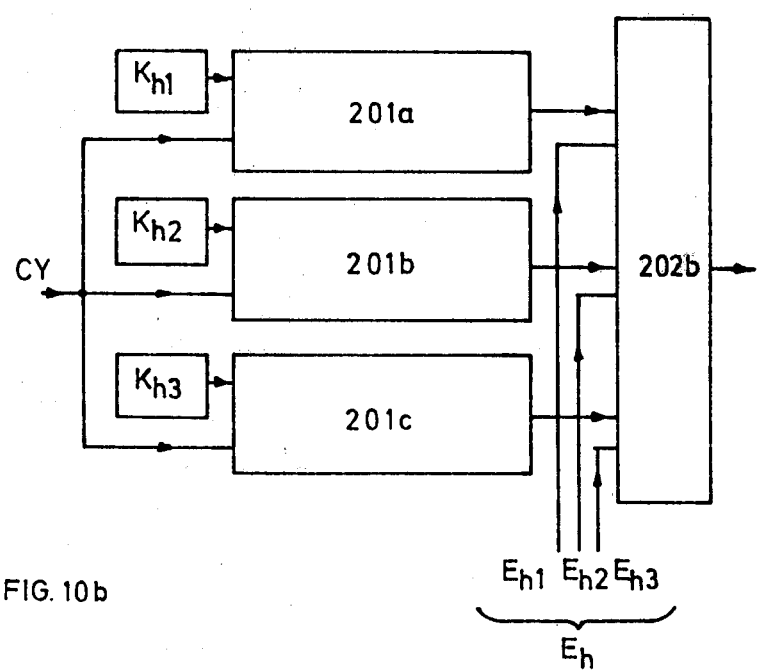
Figure 11:
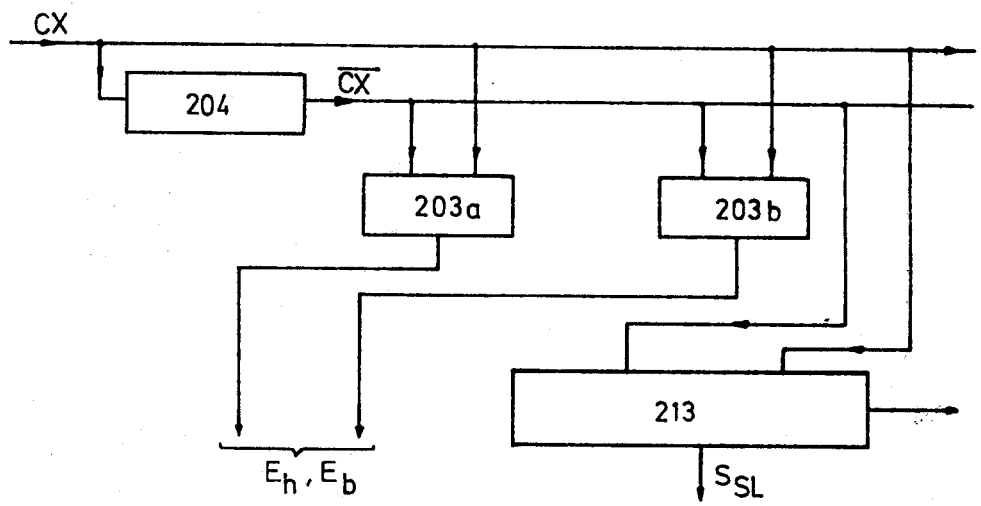
Figure 13:
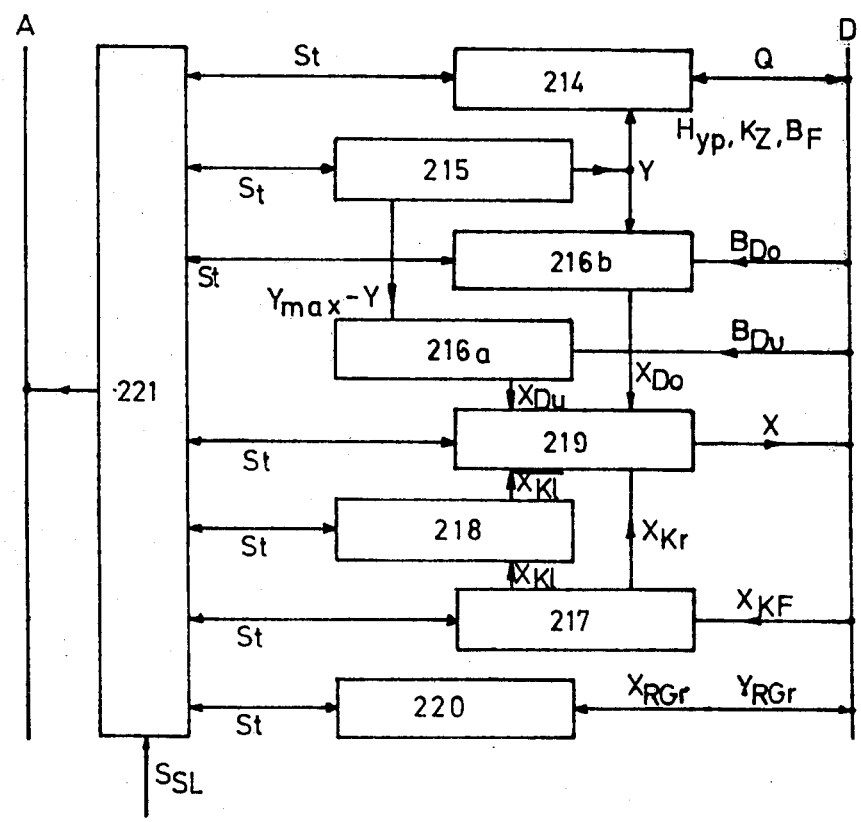
Figure 12:
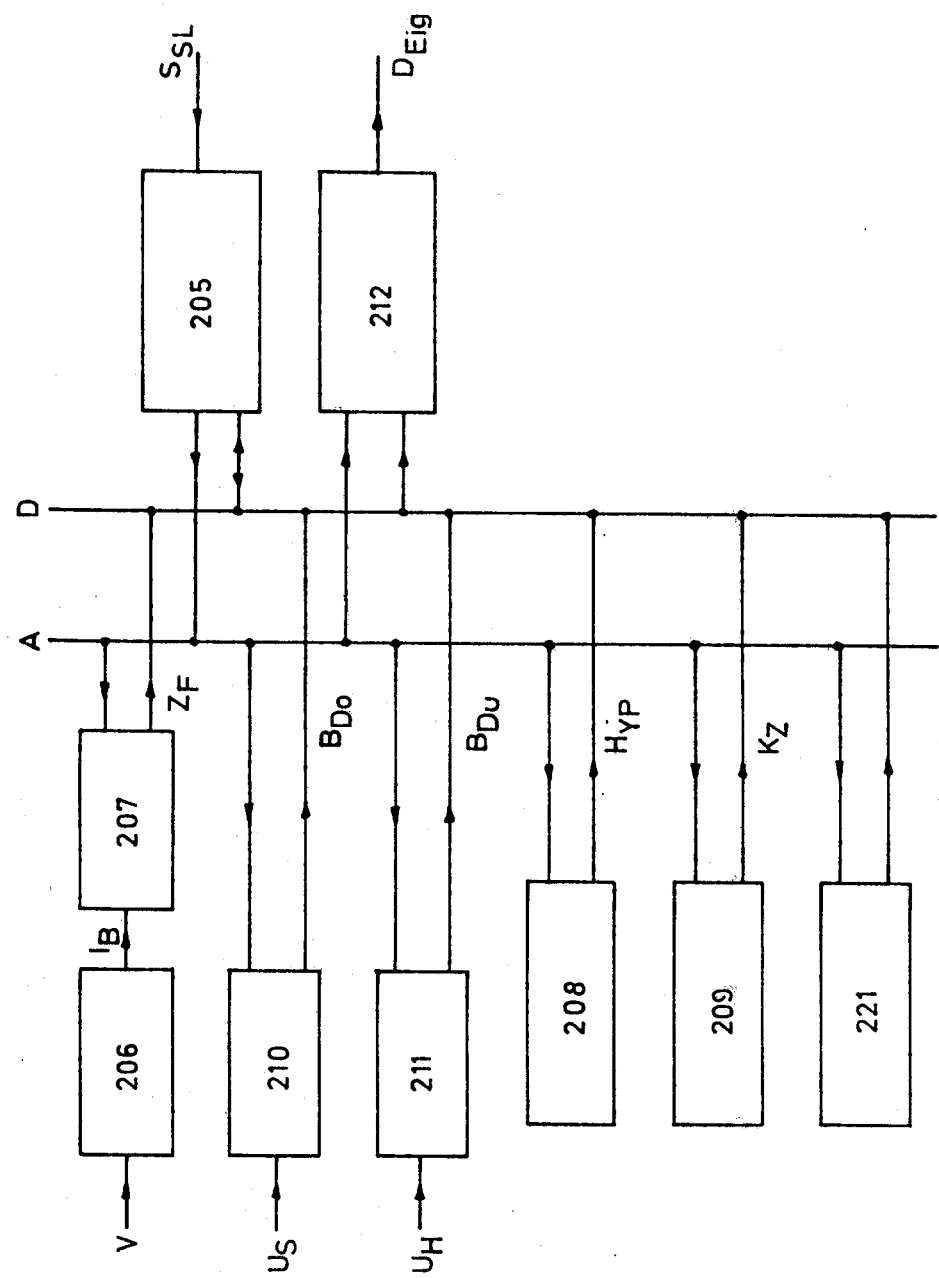
Figure 14:
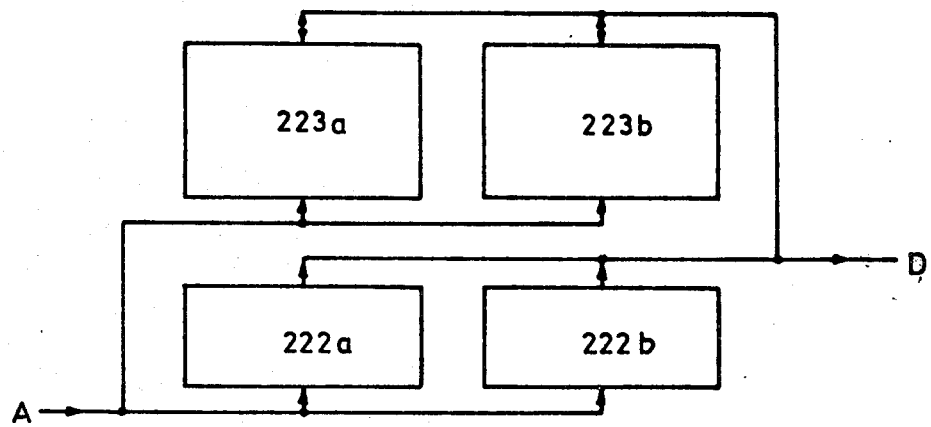
Figure 15:
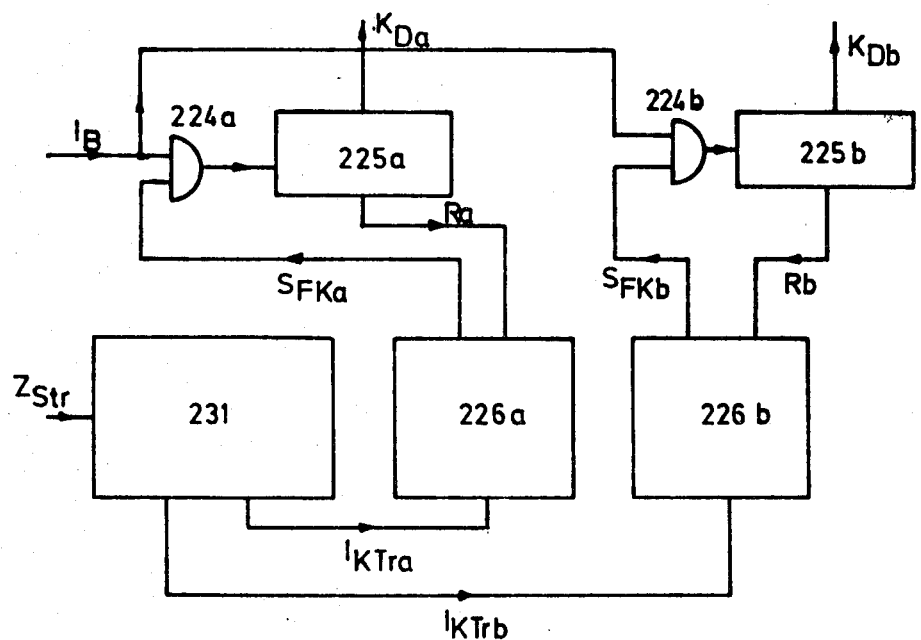
Figure 16:
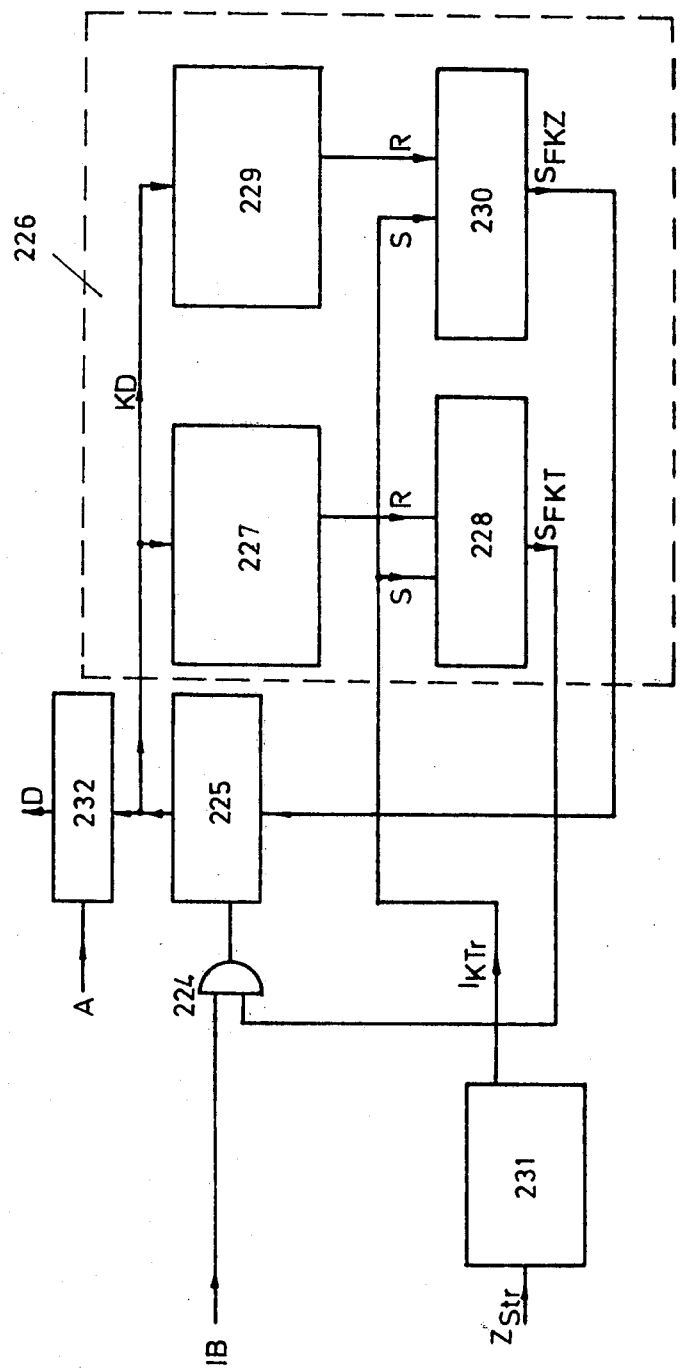
Figure 17:
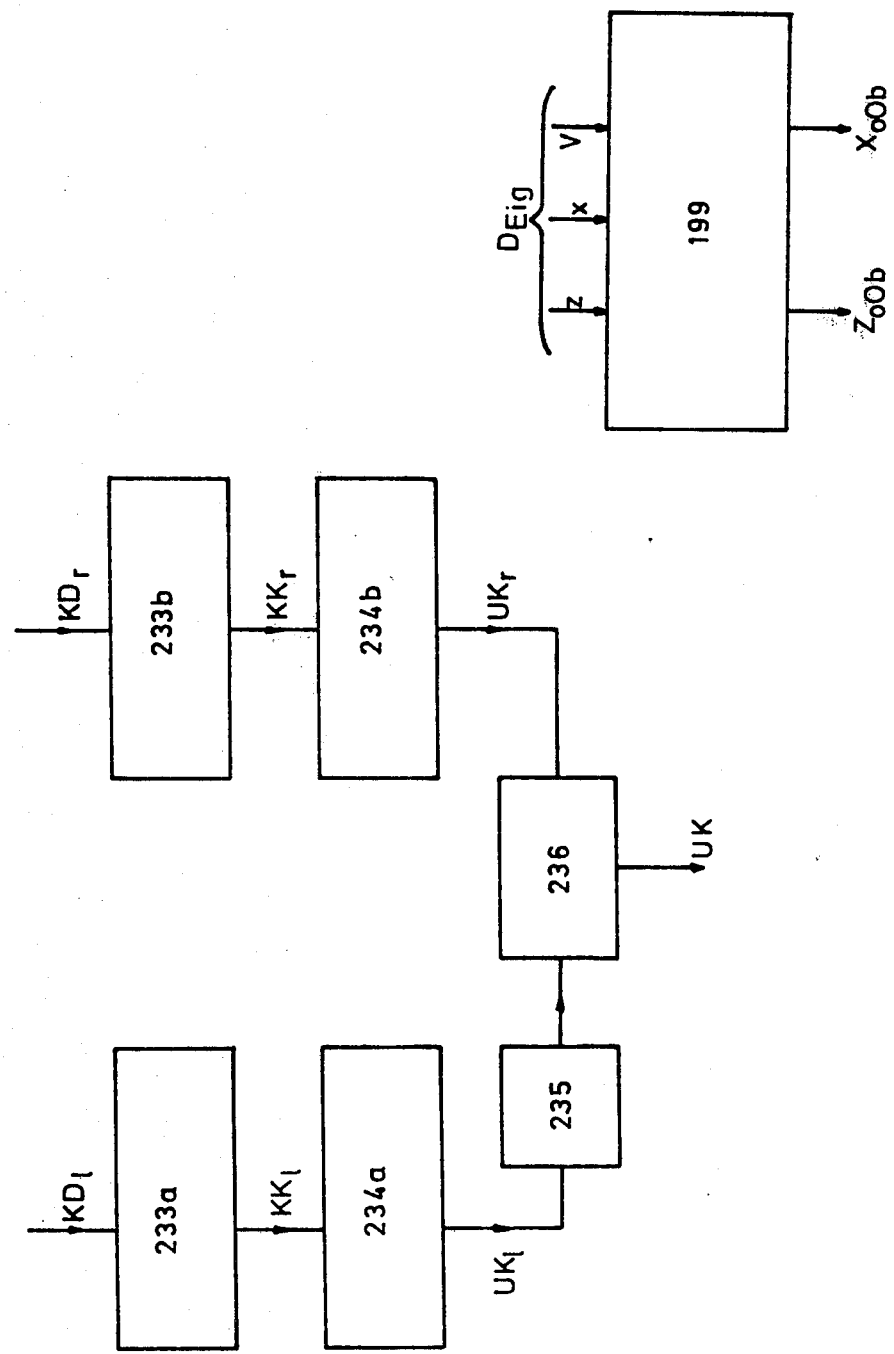
Figure 18:
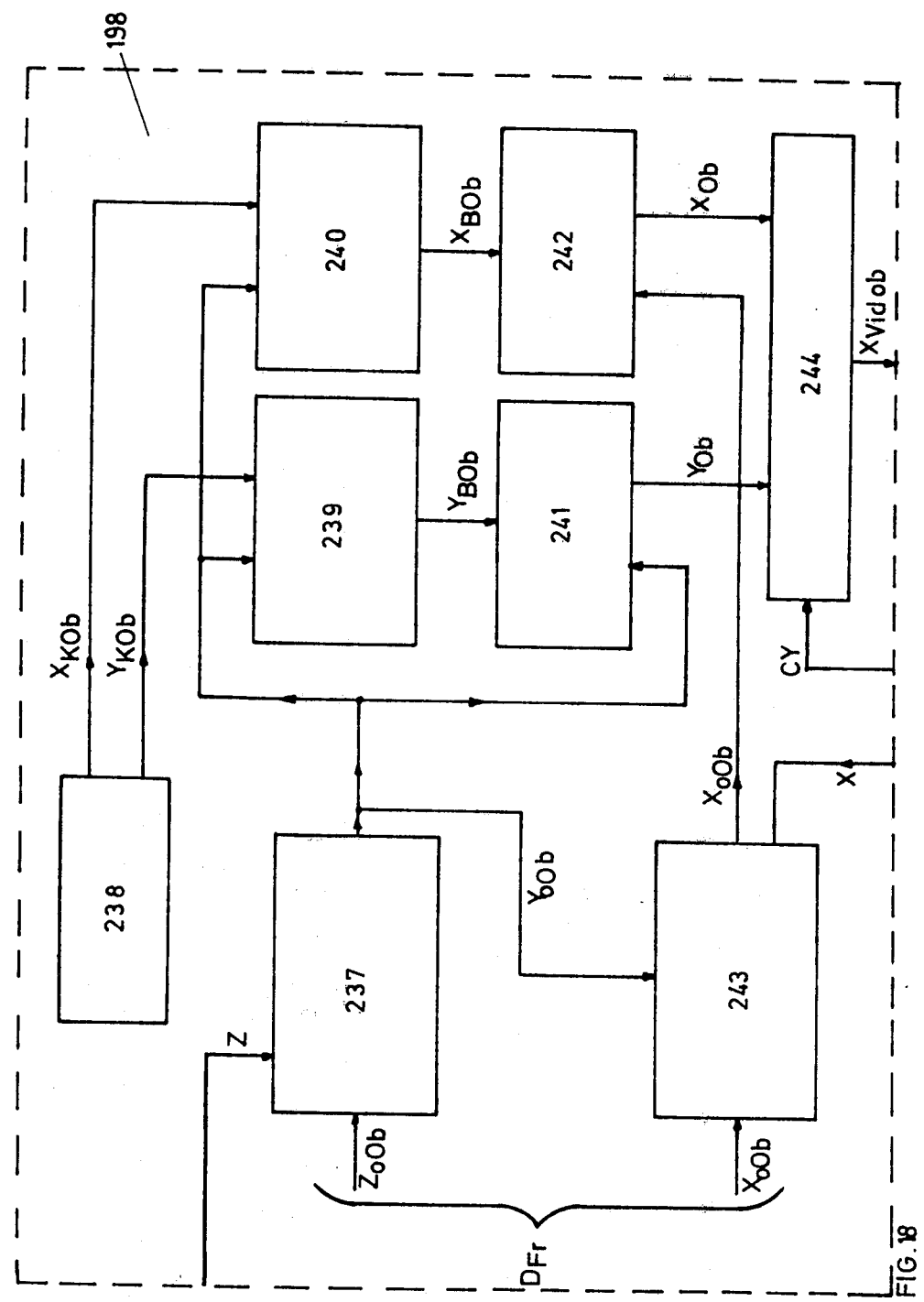
Figure 20:
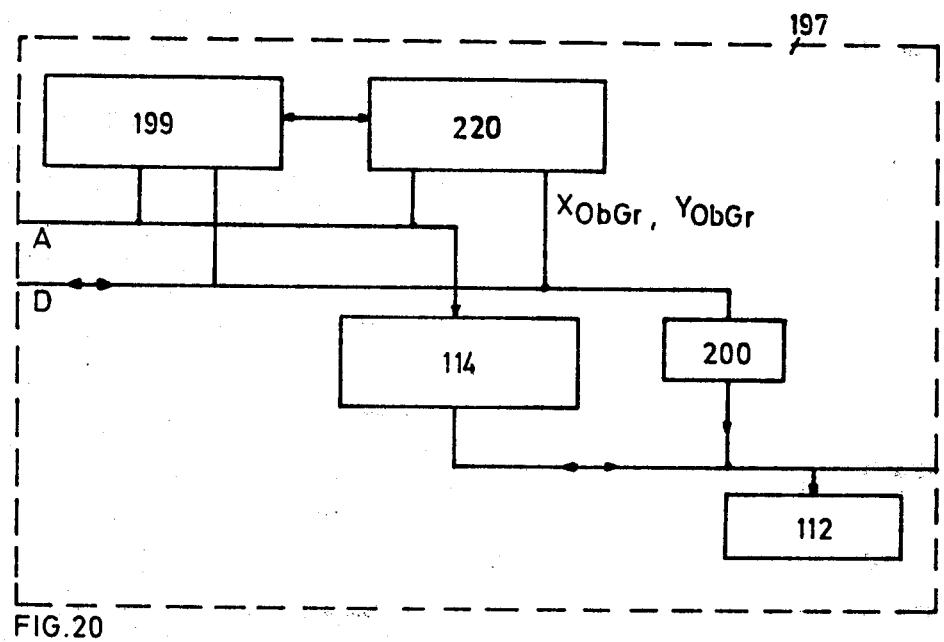

FIG. 3 by way of a block diagram shows the devices for the generation of the road picture, block A from FIG. 1;

FIG. 4 shows the range wedge generator of FIG. 3;

FIGS. 5a and 5b show portions of the light spot pair generators of FIG. 3;

FIGS. 6 and 7 likewise show a portion of the light spot pair generators of FIG. 3;

FIG. 8 shows the rectangle generator of FIG. 3;

FIG. 9 shows the device for signal combination from FIG. 3;

FIGS. 10a and 10b show two possibilities for presetting the height with the multiplication of FIG. 3;

FIG. 11 shows the generator of FIG. 3 for select pulses;

FIG. 12 shows the speed proportional signal generator of FIG. 3;

FIG. 13 shows the digital computer of FIG. 12;

FIG. 14 shows the standard curve function generator of FIG. 1;

FIG. 15 shows the digital curve program generator of FIG. 1;

FIG. 16 shows, as an alternative to the device of FIG. 15, a device for the release of the curve distance counters;

FIG. 17 shows the road curvature generator of FIG. 1;

FIG. 18 shows the object coordinate computer of FIG. 1;

FIG. 19 shows the partner behavior computer of FIG. 1;

FIG. 20 shows the partner vehicle picture generator of FIG. 1; and

Figure 21:
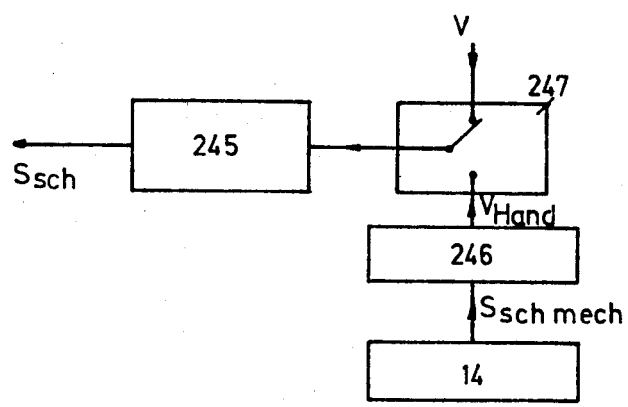

FIG. 21 shows an extension of a portion of FIG. 1 for speed computation.

Referring now to the drawings in detail, FIG. 1 shows the most essential functional blocks of the driving simulator:

A—devices for the generation of the road picture,
B—devices for the generation of curves,
C—devices for the alteration of the road picture at track deviations of the simulated vehicle,
D—devices influencing the speed,
E—devices for the generation of noises,
F—devices for the reaction of the simulator at faulty actions of the driver, and
G—devices for the generation of the distance and for measuring the driving time.

The devices C–G are known from U.S. Pat. No. 4,077,138. The symbols mean:

1—monitor
2—top part of the screen for representation of the sky
3—light spots for the representation of embankment posts
4—horizon
5—immobile light spot for the representation of the car front
8—steering wheel
9—horizontal shifting control device
10—computing device for speed computation
11—accelerator pedal
12—brake pedal
13—clutch pedal
14—gear shift
21—monostable multivibrator
22—error counter
23—distance program generator
24—push button or coin acceptor
25—clock
b—Signal voltage for the acceleration of the simulated car
$bFexz$—Signal voltage for the excessive centrifugal acceleration
n—signal voltage for the rotation of the simulated engine
$S_{AF}$—stop signal from the error counter
$S_{AS}$—stop signal
$S_{AU}$—stop signal from the clock
$S_E$—start signal
$S_{Fe}$—error triggering signal
$S_{FeM}$—error measuring signal
$S_{ku}$—switching signal supplied by the clutch pedal
$S_{Ru}$—signal for sliding under deceleration
$S_{Schm}$—position of the gear shift lever
$U_{Br}$—voltage supplied by the brake pedal
$U_{gas}$—control voltage supplied by the accelerator pedal
$U_H$—control voltage of the track angle (for the distortion of the road picture around a bottom turning point)
$U_k$—signal voltage being proportional to the curvature of the road
$U_s$—control voltage of the parallel track position (for the distortion of the road picture around a top turning point)
V—speed signal
$W_L$—angle of the steering wheel
$X_G$—position of the accelerator pedal The device for the generation of the road picture is characterized by the following new conception:

Line pairs symmetrical to the middle of the road and at a height level above ground are generated by so-called range wedge generators. The intermediate area is called "range wedge". The range wedges are generated in the videosignal generator by adding and substracting to an abscissa x for every monitor line V a width value which is proportional to the line number V. At track movements and curves the road picture is altered by alteration of the abscissa of the middle of the road.

Figure 2:
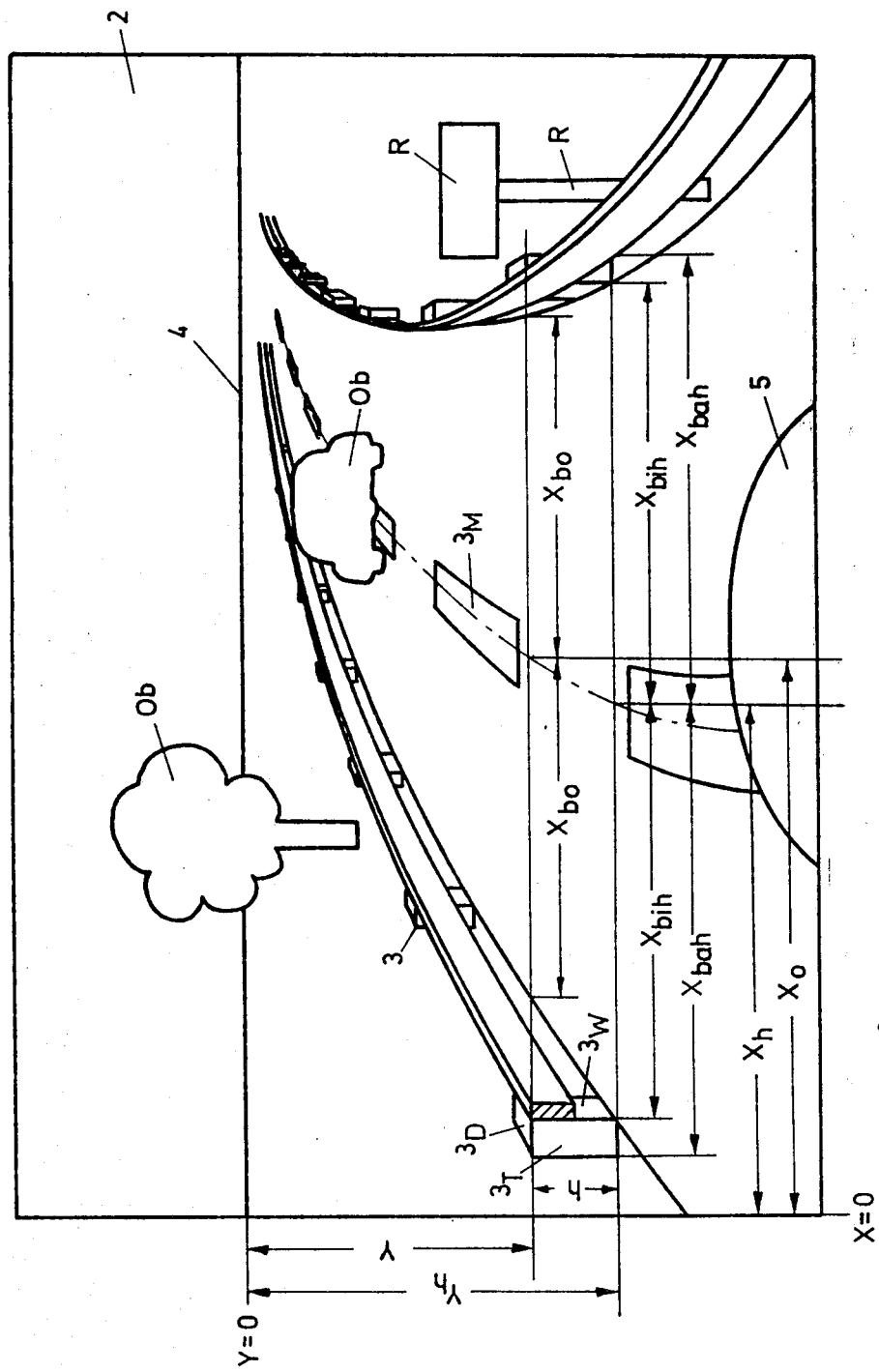
FIG. 2 is a view on the television screen showing an example of a road picture.

FIG. 2 shows the limiting lines between road and field, a middle stripe, and crash barriers. The corresponding areas are generated by the output signals of the range wedge generators. Furthermore, FIG. 2 shows posts 3, which are equidistant and correspond to the light spot pairs 3 in U.S. Pat. No. 4,077,138. Every post pair comprises plate area pairs $3_T$, wall area pairs $3_w$, and ceiling area pairs $3_D$. These posts are generated in light spot pair generators. Furthermore, FIG. 2 shows a traffic sign, which comprises rectangles R. These rectangles are generated in rectangle generators. Furthermore, FIG. 2 shows irregularly appearing objects Ob, a tree and a car. These objects are generated in object generators. In the foreground, FIG. 2 shows the front part 5 of the car.

Furthermore, FIG. 2 shows for example the line y, which describes the upper edge of the nearest post, as ranged lines are generated in principle by range wedge generators. The distance of the instantly written line from the horizon is Y. The horizon itself is Y=0. It is assumed that for every line, a corresponding abscissa for the middle of the road and for ground level can be read from a random access memory. For the left screen limit, X=0. In the example of FIG. 2, a TV-beam of the line Y has to generate X-values for several ranged lines, namely the upper outside edge of the left posts, the upper inside edge of the left posts, the upper inside edge of the left crash barrier, the lower inside edge of the left crash barrier, the left road limit, the left middle stripe limit, and the corresponding points for the right half of the road.

Every range wedge generator generates by use of the abscissas for the middle of the road a pair of lines of equal height level by addition and subtraction of a width value, which depends upon the distance from the horizon according to the perspective. For example, for the range wedge of the upper inside edges of the posts the abscissa $X_h$ for the middle of the road at road level is used. This value can be read from the memory at addressing with $Y_h$. $Y_h$ is calculated by multiplication of Y with a height factor $K_h$. The width value $X_{bih}$ is calculated by multiplication of the line $Y_h$ with a width factor $K_{bi}$ which belongs to the inside edge of the posts. For the range wedge of the upper outside edges of the posts the same abscissa $X_h$ is used because it has the same height level h. The width value $X_{bah}$ is calculated by multiplication of the line $Y_h$ with a width factor $K_{ba}$ which belongs to the outside edge of the posts. For the range wedge for the road limits, the abscissa $X_o$ for the middle of the road is used, which belongs directly to the line Y. The width value $X_{bo}$ is calculated by multiplication of the line Y with the width factor $K_b$ which belongs to the width of the road.

FIG. 3 shows the functional blocks which are included in the video-signal generator 101 and the light spot device 102, and the signal connections between all functional blocks of the devices A for the generation of the road picture. A common bus or signalling line $X_h$ is used for the presetting of the abscissas for the middle of the road. On this bus are at the invisible beginning of each monitor line in successive sequence the $X_h$-values for the invidicual height levels. By use of select pulses $E_h$, the $X_h$-values for the range wedge generator of the corresponding height level are read from common bus and stored for the duration of a whole line. A further common bus $X_b$ is used for the presetting of the width values. On this bus are at the beginning of each monitor line in the invisible range in successive sequence the $X_b$-values for the different width. By use of select pulses $E_{bi}$, the $X_b$-values for the range wedge generator of the corresponding width are read from the common bus and stored for the duration of a whole line.

Besides the abscissas $X_h$ for the middle of the road, line selects $Q_h$ are supplied for every line, which usually are equidistant in the longitudinal direction of the road and which enable the figuring of discrete light spot pairs 3, which move periodically through the road picture. For example, these $Q_h$ values indicate whether for a certain line the road middle stripe is bright or dark, or whether a post appears or not. The $Q_h$-values for the individual bright levels are also at the beginning of each monitor line in the invisible range in successive sequence on the common bus. By use of the select pulses $E_h$, the $Q_h$-values for the corresponding light spot pair generators are read from the common bus and stored for the duration of the whole line.

As FIG. 3 shows in detail, the video signal generator 101 includes range wedge generators 108, the inputs of which are the abscissa reference signal $X_h$, the width signal $X_b$, the current column signal CX, and the select pulses $E_h$ and $E_b$, and the output signals of which are the abscissas $X_K$ of a range wedge. The video-signal generator includes light spot generators 104, the input signals of which are the line select signals $Q_h$, the outputs of the range wedge generators 108, the current column signal CX, and the select pulses $E_h$ and $E_b$, and the output signals of which are the abscissas $X_L$ of a light spot pair.

The videosignal generator 101 includes rectangle generators 112 supplying the signals $X_R$ for the rectangular areas R and using as inputs the limiting values supplied by the control device for the area pair generators, and a device 113 for the signal combination in which all signals from the range wedge generators 108, from the area pair generators 104, and from the rectangle generators 112 are combined to the video signal $S_{Vid}$ fot the TV monitor 1.

The area pair control device 102 includes a write-read memory 114 storing the abscissas $X_h$ for the middle of the road, the line select signals Q, and the rectangle coordinates, which is written by the speed proportional signal generator 103 by use of the digital computer 205 and a buffer 200, and which is read by the video signal generator 101, whereby by use of a data selector 120 for the writing process the addresses Y are supplied from the speed proportional signal generator 103, and for the reading process the addresses are supplied by a current line signal $Y_h$ which is generated in a column-and-line-generator 116 and which is multiplied in a multiplier 115 by a height factor $K_h$, a multiplying device 117 supplying the width signals $X_b$, one input of which being the current line signal CY, the other a width factor, a generator 118 for select pulses sequentially supplying pulses for the selection of the individual X- and Y-values to the multiplier 115 for the height presetting, to the multiplier 117 for the width presetting and for the video-signal generator 101, according to the individual height and width factor of one range wedge, a generator for the front part of the car supplying the image 5 of the front part of the car using the current column signal CX and the current line signal CY, and several object generators 197 computing the object area coordinates $X_{Ob}$ by using as inputs the data $D_{Eig}$ of the own vehicle and $D_{Fr}$ of partner vehicles.

FIG. 4 shows the circuit of the range wedge generator 108. It is used for the representation of range wedges and ranged lines of different height levels and width. The device for the generation of range wedge includes a random access memory 121 storing that reference signal $X_{hF}$ which is processed by the individual range wedge generator and which is also supplied for a short period only, using as input for the memory the $X_h$-values, the memory being updated at the beginning of every monitor line by an individual select pulse $E_{hF}$, a further random access memory 122, storing that width signal $X_{bF}$ which is processed by the individual range wedge generator and which is also supplied for a short period only, using as input the $X_b$-values, the memory being updated at the beginning of every monitor line by another individual select pulse $E_{bF}$, an adding device 123 by which the output $X_{bF}$ is added to the output $X_{hF}$, and a subtracting device 124 in which the output $X_{bF}$ is subtracted from the output $X_{hF}$, two comparators 125 and 126 in which the outputs of the subtraction device and the adding device are compared with the current column signal CX, two AND-gates 128 and 129 to which the, in an inverter 127 inverted carry bit $SÜ_{pos}$ of the adding device, is supplied for the prevention of double pictures at overflow, two further AND-gates 131 and 132 to which in the same way the, in an inverter 130 inverted carry bit $SÜ_{neg}$ of the subtraction device 124, is supplied, two further AND-gates 129 and 132, the inputs of which being the equal-outputs of the two comparators 125 and 126 and the inverted carry bits and the outputs being the output $X_{lF}$ and $X_{rF}$ of the range wedge generator, and a further AND-gate 133, one input of which being the output of the comparator 125 for the right range wedge limit and for the left range, and the other input of which being the output of the comparator 126 for the left range wedge limit and for the right range and the output of which being the video signal $X_{KF}$ for the range wedge area, all range wedge generators being equal.

FIG. 5a shows how ceiling area pairs $3_D$ are generated by use of two stripes which are figured by range wedges and by use of a line select signal. The pertaining device 109 includes a random access memory 134D storing a line select signal $Q_D$ for the ceiling area $3_D$ in the height level h which is defined by the select pulse $E_{hD}$, an AND-gate 135 in which the signal $X_{KDa}$, which is supplied by a range wedge generator for the outside range wedge of the ceiling pair, is combined together with the signal $X_{KDi}$, which is supplied by a range wedge generator for the inside range wedge of the ceiling pair and which is inverted in an inverter, into a double wedge shaped ceiling stripe pair signal $X_{KD}$, and a further AND-gate 137D in which the line select signal $Q_D$ is combined together with the ceiling stripe pair signal $X_{KD}$ to the ceiling area pair video signal $S_D$.

FIG. 5b shows a simplification of the circuit from FIG. 5a for the case that only one ceiling area row, symmetrical to the middle of the road, as for example an interrupted middle stripe $3_M$, is generated. The pertaining device includes a special ceiling area generator which uses only one range wedge generator output signal $X_{KM}$, renouncing the AND-gate 135 and the inverter 136, and generating only one video signal $X_M$ for a stripe $3_M$ which is symmetrical to the middle of the road.

FIG. 6 shows how the analog light spot pairs, which are described in U.S. Pat. No. 4,077,138, can be generated digitally by storing the upper corners of a plate area pair $3_T$ for a certain number of lines. The pertaining area pair generator 110 includes a random access memory 146T storing the upper line $Q_{To}$ of all plate areas $3_T$, and another random access memory 147T storing the lower line $Q_{Tu}$ of all plate areas, these memories being updated at the beginning of every monitor line by the select pulses $E_{hTo}$ and $E_{hTu}$ for the height levels of the plate area pairs concerned, a flip-flop 148 supplying a plate area beam signal $S_{TB}$ which is set by the signal $Q_{To}$ and reset by the signal $Q_{Tu}$, four random access memories 149T–152T each storing an X-value from the current column signal CX, these X-values being updated via four AND-gates 138–141 by the outputs $X_G$ of the two range wedge generators defining the upper plate area corners when the signal $Q_{To}$ for the upper line of the plate area pair is positive, four comparators 153T–156T in which the four stored X-values are compared with the current column signal CX, two AND-gates 142 and 143 combining the range outputs of the comparators 153T–156T to the plate area trunk signals $S_{TNl}$ and $S_{TNr}$, an OR-gate 144 adding these two signals to a plate area pair trunk signal $S_{TN}$, and an AND-gate 145 combining this signal $S_{TN}$ together with the plate area beam signal $S_{TB}$ to the plate area pair video signal $S_T$.

FIG. 7 shows how wall area pairs are generated by use of trunk pairs and stripe pairs. The pertaining wall area pair generator 111 includes a random access memory 146 W storing the line $Q_{oWh}$ for the upper far corner $3_{oh}$ of the wall areas $3_W$, and another random access memory 147 W storing the line $Q_{oWv}$ for the upper near corner $3_{ov}$ of the wall areas $3_W$ from the corresponding signals $Q_{hWh}$ and $Q_{hWv}$, these memories being updated at the beginning of every monitor line by the select pulse $E_{Wo}$ for the height level of the upper wall area limit, four random access memories 149W–152W each storing an X-value from the current column signal CX, these X-values being updated via four AND-gates 138W–141W by the two outputs $X_G$ of the range wedge generator defining the upper limit of the right and the left wall area when the two signals $Q_{oWh}$ and $Q_{oWv}$ for the lines of the far and the near upper corners of the wall area pairs are positive, four comparators 153W–156W in which the four stored X-values are compared with the current column signal CX, an AND-gate 157 combining the range outputs of the two comparators for the near edges of the wall areas to the near wall area trunk signal $S_{WNv}$, an AND-gate 158 combining the range outputs of the two comparators for the far edges of the wall areas to the far wall area trunk signal $S_{WNh}$, two AND-gates 159 and 160, the inputs of which are supplied crosswise by the signals $S_{WNv}$ and $S_{WNh}$ directly and inverted in two inverters 161 and 162, and the outputs of which are added in an OR-gate 163 to the wall area pair trunk signal $S_{WN}$, two AND-gates 164 and 165, the inputs of which are supplied crosswise by the output signals $X_{KWo}$ and $X_{KWu}$ of two range wedge generators for the upper and the lower limit of the wall area pairs directly and inverted in two inverters 166 and 167, and the outputs of which are added in an OR-gate 168 to the wall area pair stripe signal $S_{WJ}$, and an AND-gate 169 combining the signals $S_{WJ}$ and the $S_{WN}$ to the wall area pair video signal $S_W$.

For the generation of single rectangles representing traffic signs, house walls, or extraneous vehicles, the limiting abscissas and ordinates are used. The abscissas are supplied from the abscissa bus $X_h$. The ordinates are either preset by line select signals Q, or are likewise supplied from the abscissa bus $X_h$. The presetting by line select signals has the disadvantages that additional Q connections are necessary and that the computer has to supply Q values line for line and for every individual rectangle, which requires an unnecessary use of time. Therefore, also the ordinates should be supplied via the abscissa bus. However, in this case additional lines Y are required as addresses, which cannot be used any more for the representation of the road.

FIG. 8 shows a rectangle generator 112. It includes four random access memories 171–174 which store the values $Y_u$ for the lower, $Y_o$ for the upper, $X_l$ for the left, and $X_r$ for the right limit, the input signals of which are supplied by the data bus $X_h$ and which are updated via AND-gates 175–178 when the select pulse $E_u$ for the road level at the beginning of each line, a select pulse $E_R$ for the individual rectangle for the duration of four lines, and a select pulse $E_{GR}$ for the limiting value concerned for the duration of one line, appear simultaneously, a device for the logical selection of four lines which generates the select pulses $E_{GR}$ by using the current line signal CY, two comparators 179 and 180 comparing the outputs of the Y-value memories 171 and 172 with the current line signal CY, two comparators 181 and 182 comparing the outputs of the X-value memories 173 and 174 with the current column signal CX, an AND-gate 184 combining the range wedge outputs of the comparators 179 and 180 to the rectangle beam signal $S_{RB}$, an AND-gate 185 combining the range outputs of the comparators 181 and 182 to the rectangle trunk signal $S_{RN}$, a device combining the signals $S_{RB}$ and $S_{RN}$ to the rectangle signal $S_R$, and a device combining the rectangle beam signals $S_{RB}$, the rectangle trunk signals $S_{RN}$, and/or the rectangle signals $S_R$ to the video signal for an object area.

FIG. 9 shows a device 113 for signal combination. It includes one or more devices 187 for the generation of stripes according to range wedges of different height level, the inputs of which are the wedge area output signal $X_{KJo}$ of the range wedge generator for the upper limit of the stripe and the wedge area output signal $X_{KJu}$ of the range wedge generator for the stripe, two AND-gates 190 and 191, the inputs of which are supplied crosswise by the signals $X_{KJo}$ and $X_{KJu}$ directly and inverted in two inverters 192 and 193, and the outputs of which are added in an OR-gate 194 to the video signal $X_{Jv}$ for vertical or sloping stripes, one or more devices 188 for the generation of stripes according to range wedges of different height level, the inputs of which are the wedge area output signal $X_{KJa}$ of the range wedge generator for the outside limit of the stripe and the wedge area output signal $X_{KJi}$ of the range wedge generator for the inside limit of the stripe, an AND-gate 195 combining the signal $X_{KJa}$ with the, in an inverter 196 inverted, signal $X_{KJi}$ to the video signal $X_{Jh}$ for horizontal stripes, one or more devices 170 for the generation of signals $X_{RF}$ for rectangle figures by logical combination of the output signals $S_{RB}$, $S_{RN}$, and $S_R$ of several rectangle generators 112, and a device 189 for signal adding and color assignment in which all video signals are rated according to their color and intensity and added in a known way.

FIG. 10 shows two possibilities for the multiplication 115 for the presetting of the height. If the constant factors are powers of 2 or simply sums of such powers, the multiplication is very simple and the circuit according to FIG. 10b should be used.

FIG. 10a shows a multiplying device 115 for the presetting of the height. It includes a multiplier 201 in which the current line signal CY is multiplied with the output $K_h$ of a data selector 202a, the inputs of which are three height factors $K_{h1}$, $K_{h2}$, and $K_{h3}$ and are supplied to the data selector dependent upon the pertaining select pulses $E_{h1}$, $E_{h2}$, and $E_{h3}$.

FIG. 10b shows alternatively a multiplying device 115. It includes three multipliers 201a, 201b, and 201c, in which the current line signal CY is multiplied with the height factors $K_{h1}$, $K_{h2}$, and $K_{h3}$, and a data selector 202b, the inputs of which are the outputs of the multiplier and are supplied to the data selector dependent upon the pertaining select pulses $E_{h1}$, $E_{h2}$, and $E_{h3}$.

The multiplying device 117 for the presetting of the width functions like the multiplying device 115 for the presetting of the height. Only different constant values $K_b$ are used. It is also possible to generate the width signals $X_b$ by direct multiplication of the current line signal CY with a combined height and width factor $K_h \times K_b$.

FIG. 11 shows the generator 118 for select pulses. It includes AND-gates 203a and 203b which select the select pulses from the current column signal CX and from the, in a complement generator 204 inverted, signal CX during the invisible beginning of every monitor line, and a device 213 for the logical selection of the write/read pulse for the digital computer 205.

The speed proportional signal generator is the central control unit of the driving simulator. It supplies the digital signals for the alteration of the road picture, using as inputs the analog signals of the speed V, track angle $U_H$, and the parallel track position $U_S$. The picture alteration at a track angle according to U.S. Pat. No. 4,077,138 is corrected. The theoretical basis for the signal processing is now a distortion of the abscissas for the middle of the road which increases from bottom to top.

FIG. 12 shows the speed proportional signal generator 103. It includes a drive signal counter 207, the input of which is the output pulse $I_B$ of the known voltage-frequency-converter 206, and which supplies a periodic, current, digital drive signal $Z_F$ to the data bus when addressed by a certain address from the digital computer 205, an analog-digital-converter 211 converting the voltage $U_H$, which is proportional to the track angle, into a digital picture turning signal $B_{DU}$, and feeding this signal at proper addressing into the data bus, an analog-digital-converter 210 converting the voltage $U_S$, which is proportional to the parallel track position, into a digital picture turning signal $B_{Do}$, and feeding this signal at proper addressing into the data bus, a read only memory 208 for a hyperbolic function Hyp, a constant value source 209 for the presetting of the distances $K_Z$ of the light spot pairs, a constant value source 221 for object distances and sizes, an output interface device 212 supplying the data $D_{Eig}$ of the own vehicle, specifically the parallel track position x and the distance z in the longitudinal direction of the road, and a program store causing the digital computer 205 to compute the values X for the middle of the road and the line select signals Q line by line using as inputs the signals $Z_F$, Hyp, $K_Z$, $B_{Do}$, and $B_{Du}$, to feed them into the data bus, and to feed the signals for the pertaining lines together with the control signals for the addressing of the connected functional blocks at release by the write-read-signal $S_{SL}$ into the address bus.

The digital computer uses a commercial microprocessor, which has an address bus and a data bus and which processes all necessary operations step by step.

FIG. 13 shows the digital computer. It includes a Q-calculator 214 computing the line select signals Q by use of the hyperbolic function, which is stored in the memory 208 and by use of the positions of the light spot pairs which are defined by the drive signal $Z_F$ and the constant values $K_Z$ and which are equidistant in the road, and feeding these signals Q via the data bus into the write-read-memory 114, a device 215 for the incrementing and decrementing of lines Y functioning independently from the beam frequency of the TV monitor, a multiplier 216a computing the share $X_{Du}$ of every line of the picture distortion around the lower turning point, using as factors the track angle $B_{Du}$ and the number $Y_{max}$-Y of the line, a multiplier 216b computing the share $X_{Do}$ of every line of the picture distortion around the upper turning point using as factors the parallel track position $B_{Do}$ and the number Y of the line, a device 217 for storing and data output of the values $X_{Kr}$ for right curves and $X_{Kl}$ for left curves and a complement generator 218 inverting the left curves, an adding device 219, adding the signals $X_{Du}$, $X_{Do}$, $X_{Kr}$, and $X_{Kl}$ to the signal X for the middle of the road, which is fed with proper addressing via the data bus into the write-read memory 114, a computing unit 220 for the computation of the rectangle coordinates, which computes the rectangle limit coordinates $X_{RGr}$ and $Y_{RGr}$ using the constant data from the constant value source 221 for rectangle distances and rectangle sizes and which feeds these values with proper addressing via the data bus into the write-read-memory 114, and a pulse frequency generator and controller 221 which is tied via control connections St to the individual computing units 214–220 and which generates in a known way the clock pulse for the computing steps, manages the sequence of the operations, and prevents during the read cycle of the write-read-memory 114 via the write-read-signal $S_{SL}$ any data output.

After the above explanation of the functioning of the video signal generator 101 and the area pair control device 102 by use of the FIGS. 2–13, the digital devices for the generation of curves may now be explained which are shown in FIG. 1.

FIG. 14 shows a standard curve function generator 105. It includes digital read-only memories 222, which are addressed via the address bus A from the digital computer 205 and from content of which for every curve distance $Z_K$ and for every line Y a curve abscissa $X_K$ can be read or computed.

To save store capacity, it is feasable to exploit the fact that the curve abscissas have many zeros, that the curve function does not alter very much in the lower range, and that the curve exit can be calculated from the curve entrance under certain circumstances. Therefore, curve abscissa calculators 223a and 223b are used which compute the curve abscissas $X_K$, using as inputs the stored data.

FIG. 15 shows the digital curve program generator 106. It includes two curve distance counters 225a and 225b, which feed curve distance signals $K_{Da}$, $K_{Db}$ into the data bus D when being addressed by the digital computer 205, two-AND-gates 224a, 224b supplying the base pulse $I_B$ from the speed proportional pulse generator 103 to the curve distance counters 225a, 225b, if release signals $S_{FKa}$, $S_{FKb}$ are positive, two devices 226a, 226b, for the release of the curve distance counters, which are reset by the counters 225a, 225b, and a read-only memory 231 for a curve sequence program, which is addressed by the distance signal $Z_{Str}$ from the distance program generator 23 and which supplies curve trigger pulses $I_{KTra}$, $I_{KTrb}$, by which the devices 226a, 226b for the release of the curve distance counters are set.

If for the shape of the curve a circle is assumed, the curve function does not alter during the driving.

This behavior is exploited by stopping the curve distance counter at the beginning of the circle, and by triggering of the curve exit by a second triggering pulse.

FIG. 16 shows that the device 226 for the release of the curve distance counters includes:

a device 227 for the logical selection of a curve-entrance end pulse, the input of which is the output KD of the curve distance counter 225, and a flip-flop 228 for the opening of the counting gate 224, which is set by the read-only-memory 231 for the curve sequence program and which is reset by the device 227 for the logical selection of the curve-entrance end pulse, a device 229 for the logical selection of the curve-exit end pulse, the input of which is likewise the output KD of the curve distance counter 225, and a flip-flop 230 for the release of the curve distance counter 225, which is set by the read-only-memory 231 for the curve sequence program and which is reset by the device 229 for the logical selection of the curve-exit end pulse, and a buffer 232, which supplies the output of the curve distance counter 225 to the data bus D when addressed via the address bus A.

FIG. 17 shows the road curvature generator 107. It includes two curve curvature read-only memories 233a, 233b, which are addressed by the outputs KD of the curve distance counters 225 and which supply digital curve curvature signals KK, two digital-analog-converters 234a, 234b, in which the digital signals KK are converted into the analog curve curvature voltages $U_{Kl}$ and $U_{Kr}$, polarity inverters 235 for all left curve curvature voltages $U_{Kl}$, and a subtraction device 236 in which all curve curvature voltages are added to the road curvature voltage $U_K$.

FIG. 18 shows that the object coordinate computer 198 includes an object shape read-only memory 238 in which the constant cross section coordinates $X_{KOb}$ and $Y_{KOb}$ of an object observed in longitudinal direction of the road and related to an origin in the road plane are stored, a calculator 237 for the distance-ordinate conversion, in which the distance $Z_{o\,Ob}$ of the object origin in longitudinal direction of the road is converted by computation to its picture ordinate $Y_{o\,Ob}$, taking into consideration the distance Z of the vehicle proper, a calculator 243 for the parallel track position-abscissa-conversion, in which the parallel track position $X_{o\,Ob}$ of the object origin is converted by computation to its picture abscissa $X_{o\,Ob}$ using the object ordinate $Y_{o\,Ob}$ and subtracting the abscissa X of the middle of the road, a multiplier 239 in which the object shape ordinates $Y_{KOb}$ are converted to the object picture ordinates $Y_{BOb}$ by multiplication with the vertical distance $Y_{o\,Ob}$ of the object origin from the horizon, a multiplier 240 in which the object shape abscissas $X_{KOb}$ are converted to the object picture abscissas $X_{BOb}$ by multiplication with the vertical distance $Y_{o\,Ob}$ of the object origin from the horizon, an adding device 241 in which the object picture ordinates $Y_{BOb}$ are added to the ordinate $Y_{o\,Ob}$ of the object origin, an adding device 242 in which the object picture abscissas $X_{BOb}$ are added to the abscissa $X_{o\,Ob}$ of the object origin, and a video signal write-read memory device 244 for the object, which generates in a known way the video signal $X_{Vid\,Ob}$ of the object, using as input the current line signal CY supplied by the outputs $Y_{Ob}$ and $X_{Ob}$ of the adding devices 241 and 242.

FIG. 19 shows the partner behavior computer 199 as one block, namely as digital computer. It computes the distance $Z_{o\,Ob}$ and the parallel track position $x_{oOb}$ of partner vehicles driving in the same or in opposite direction according to normal driving behavior, using a white noise generator, and using as input signals the distance Z, the parallel track position x, and the speed V of the vehicle proper.

In detail, this computer is not further explained here because of the large variety of the possibilities in its program store.

FIG. 20 shows how the partner vehicle picture generator 197 can be built up with simplified figuring of the vehicles while avoiding the object coordinate computer 198 by use of the rectangle coordinate computer 220, the partner behavior computer 199, the write-read memory 114, the buffer 200, and the rectangle generators 112.

The use of comparators in the range wedge generators 108, the area pair generators 104, and the rectangle generators 112 for the conversion of the computed parallel picture pattern signals into a single series signal for the brightening of the TV beam avoids time difficulties. However, with the development of fast components, the method used with todays TV games is feasible, namely to write the computed date into a repetition memory which stores all picture points and to convert the stored data into video signals. This method is also suitable for the figuring of objects, of the front part of the car, and of alpha-numerical characters.

The comparators in the range wedge generators 108, the area pair generators 104, and the rectangle generators 112 may be replaced in a known way by parallel-series-converters. Hereby a clock frequency according to the horizontal picture resolution is used. Areas are generated hereby by use of R-S-flip-flops.

In principle, rather than the line-by-line TV method, the vector beam method, which needs an X-Y-coordinate computer, may be chosen. This has the advantage that less points have to be calculated and that step functions are avoided. The disadvantage is, however, that this method is only suitable for the figuring of lines and that for the figuring of areas an additional circuit is required.

Finally, FIG. 21 shows an extension of the device 10 for the speed computation, which is included in FIG. 1. It is already known how the speed V is computed by use of the positions of accelerator pedal, brake pedal, and gear shift lever. Now, the extension comprises for the simulation of an automatic gear shift device a triggering device 245 with hysteresis, the input signal of which is the speed signal V, and the output of which is the electrical gear step signal $S_{Sch}$, and an automatic-hand selection switch 247 via which alternatively to the speed signal V the output signal of a potentiometer 246, the shaft of which is turned by the gear shift lever 14, is led to the triggering device 246.

The present invention is, of course, by no way limited to the specific disclosure of the specification and drawings, but also encompasses any modifications within the scope of the appended claims.

What I claim is:

1. A device for the simulation of a ride on a curved road using a screen of a monitor for the picture of the road perspectively observed by the driver, as well as using a program for the generation of the road picture, as well as using control devices such as accelerator pedal, brake pedal, clutch pedal, gear shift lever and steering wheel, which devices influence the road picture, as well as using several light spot pair generators, means for generating a speed signal with a voltage-frequency converter supplying a base pulse, a speed proportional signal generator, a digital curve sequence generator, several standard curve function generators, a curve sequence program generator, means for determining the curvature of the road, the track angle and the parallel track position, a curvature function generator and a distance program generator, as well as using a device for signal combination, as well as using image generators for the front part of the vehicle and for simulated partner vehicles, said device comprising in combination:

(a) a plurality of range wedge generators, including right, left, outside, inside and intermediate range wedge generators, each of which generators within limits an intermediate wedge shaped area and an intermediate band each of which includes:

at least one integrated digital random access memory component including an adding device and a subtraction device having output signals, for storing reference signals processed by the individual range wedge generator and which is supplied for a short period only; two comparators in which the outputs of the subtraction device and the adding device are compared; two AND-gates to which the positive carry bit of the adding device is supplied for the prevention of double pictures at overflow; two further AND-gates to which the negative carry bit of the subtraction device is supplied; two further AND-gates the inputs of which being the equal outputs of the two comparators and the outputs of which being the output of the range wedge generator; and a further AND-gate, one input of which being the output of the comparator for the right range wedge limit and for the left range, and the other input of which being the output of the comparator for the left range wedge limit and for the right range, and the output of which being the video signal for the range wedge area, all range wedge generators being equal;

(b) ceiling area pair generators for the representation of a nearly rectangular area being parallel to the road plane and to the axis of the road; each of which includes:
a random access memory for storing a line select signal for the nearly rectangular area; and AND-gate in which the signal supplied by a range wedge generator for the outside range wedge of the ceiling pair, is combined together with the signal supplied by a range wedge generator for the inside range wedge of the ceiling pair and which is inverted in an inverter, into a double wedge shaped ceiling stripe pair to produce a signal accordingly;

(c) plate area signal generator means, for the repesentation of rectangular lined areas which are vertical to the road plane and perpendicular to the axis of the road; each of which includes:
a first random access memory for storing the upper line signal of all plate areas;
a second random access memory for storing the lower line signal of all plate areas, a flip-flop supplying a plate area beam signal which is set by the upper line signal and reset by the lower line signal;
four random access memories each storing outputs of the two range wedge generators defining the upper plate area corners when the signal for the upper line of the plate area pair is positive;

(d) wall area generators, for the representation of nearly rectangular areas which are vertical to the road plane and to the axis of the road; each of which includes:
a first random access memory for storing the line for the upper far corner of the wall areas;
a second random access memory for storing the line for the upper near corner of the wall areas these memories being updated at the beginning of every monitor line for the height level of the upper wall area limit;
four random access memories each storing outputs of the range wedge generator defining the upper limit of the right and the left wall areas when the signals for the lines of the far and the near upper corners of the wall area pairs are positive;

(e) random access memories for the abscissas of the vertical rows for a certain number of lines, which store these abscissas as trunk abscissas until the next area pair appears said next area pair being either wall or plate area pair signals;

(f) rectangle generators for supplying the horizontal and vertical signals for the rectangular areas; each of which includes:

four random access memories which store the horizontal and vertical values for the left, and for the right limits,
two comparators each in pairs for comparing the horizontal and vertical outputs for the rectangular areas;

(g) a write-read memory for storing the abscissas for the middle of the road, the line select signals, and the rectangle coordinates, which is written by a speed proportional signal generator and a buffer for the writing process therewith;

(h) a multiplying device for supplying the width signals; and (i) a generator means for supplying pulses for the height presetting, to said multiplying device for the width presetting, according to the individual height and width factor of one range wedge; the generator means including a device for the logical selection of the write/read pulse.

2. Devices as claimed in claim 1 wherein said range wedge generators, plate area signal generator means, wall area generators, and rectangle generators are integrated circuit components.

3. A device as claimed in claim 1, comprising a special ceiling area generator which used only one range wedge generator output signal, inhibiting the AND-gate and the inverter, and generating only one video signal for a stripe which is symmetrical to the middle of the road.

4. A device as claimed in claim 1, wherein said multiplying device for the presetting of the height includes a multiplier in which a current line signal is multiplied with the output of a data selector, the inputs of which are several height factors and are supplied to the data selector dependent upon the select pulses belonging therewith.

5. A device as claimed in claim 1, wherein said multiplying device for the presetting of the height includes several multipliers in which a current line signal is multiplied with the height factors and a data selector being comprised of integrated digital data selector components, the inputs of which are the outputs of the multiplier and which are supplied to the data selector dependent upon the select pulses belonging therewith.

6. A device according to claim 4, wherein said multiplying device for the width is structured like that for the height, and the width signals are generated by multiplication of a height-rated current line signal with a width factor.

7. A device according to claim 5, wherein said multiplying device for the width is structured like that for the height, and the width signals are generated by multiplication of the height-rated current line signal with a width factor.

8. A device as claimed in claim 4, wherein said multiplying device for the width is structured like that for the height, and the width signals are generated by direct multiplication of the current line signal by the combined height and width factor.

9. A device as claimed in claim 5, wherein said multiplying device for the width is structured like that for the height, and the width signals are generated by direct multiplication of the current line signal by a combined height and width factor.

10. A device as claimed in claim 1, wherein said device for signal combination includes:
at least one device for the generation of stripes according to range wedges of different height level including ordinary digital components, the inputs of which are the wedge area output signal of the range wedge generator for the upper limit of the stripe, and the wedge area output signal of the range wedge generator for the stripe;

two AND-gates being part of an integrated digital AND-gate component, the inputs of which are supplied crosswise by the signals directly and inverted in two digital inverters, and the outputs of which are added in an OR-gate being part of an integrated digital OR-gate component to a video signal for vertical or sloping stripes;

at least one device for the generation of stripes according to range wedges of different height level of the above mentioned kind, the inputs of which are the wedge area output signal of the range wedge generator for the outside limit of the stripe, and the wedge area output signal of the range wedge generator for the inside limit of the stripe;

an AND-gate for combining the wedge area output signal with another inverted wedge area output signal to a video signal for horizontal stripes;

at least one device for the generation of signals for rectangle figures by logical combination of the output signals of several rectangle generators including integrated digital components for logical combination; and a device for signal adding and color assignment in which all video signals are rated according to their color and intensity and are added therewith.

11. A device as claimed in claim 1, comprising:
a control device for these area signal generators for supplying line select signals for the positioning of the area signals;
a control device for the area signal generators for supplying ordinates for the horizontal line pairs as beam ordinates using the line select signals; and
a logical combination device for the generation of the corresponding video signals by logically comparing the individual lines and area being supplied by the range wedge generators.

12. A device according to claim 1, wherein said speed proportional signal generator includes:
a drive signal counter being an integrated digital counter component, the input of which is an output pulse of a voltage-frequency-converter, and which supplies a periodic, current, digital drive signal to the data bus when addressed by a certain address from the digital computer;
an analog-digital-converter being an integrated digital component for converting a voltage which is proportional to the track angle, into a digital picture turning signal and feeding this signal at proper addressing into a data bus;
an analog-digital-converter for converting the voltage, which is proportional to the parallel track position, into a digital picture turning signal, and feeding this signal at proper addressing into the data bus;
a read-only memory being an integrated digital read-only-memory component for a hyperbolic function;
an output interface device including integrated digital output interface components for supplying the data of the vehicle proper, specifically the parallel track position and the distance in the longitudinal direction of the road;

a program store being an ordinary integrated digital read-only-memory component causing the digital computer to compute the values for the middle of the road and the line select signals line by line using an inputs the signals to feed them into the data bus, and to feed the signals for the pertaining lines together with the control signals for the addressing of the connected functional blocks at release by the write-read-signal into the address bus.

13. A device according to claim 1, wherein said curve function generators include digital read-only-memories which are addressed via an address bus from a digital computer and from the content of which for every curve distance and for every line there can be read or computed a curve abscissa.

14. A device according to claim 1, wherein said curve function generators include curve-abscissa-calculators being part of a central processing unit which compute the curve-abscissas using as inputs the stored data.

15. A device according to claim 1, wherein said digital curve program generator includes:
several curve distance counters being integrated digital counter components which feed curve distance signals into the data bus when being addressed by the digital computer;
an equal number of AND-gates being part of an integrated digital AND-gate component for supplying a base pulse from the speed proportional pulse generator to the curve distance counters if release signals are positive;
a read-only memory for a curve sequence program which is addressed by the distance signal from the distance program generator and which supplies curve trigger pulses by which the devices for the release of the curve distance counters are set; and
an equal number of devices for the release of the curve distance counters, which are reset for the counters; including:
a device for the logical selection of a curve-entrance and pulse being one or several ordinary digital components, the input of which is the output of the curve distance counter;
a flip-flop for the opening of the counting gate, being a part of an integrated digital flip-flop component which is set by the read-only-memory for the curve sequence program and which is reset by the device for the logical selection of the curve-entrance end pulse;
a device for the logical selection of the curve-exit end pulse, the input of which is likewise the output of the curve distance counter;
a flip-flop for the release of the curve distance counter, which is set by the read-only-memory for the curve sequence program and which is reset by the device for the logical selection of the curve-exit end pulse; and
a buffer which supplied the output of the curve distance counter to the data bus when addressed via the address bus being integrated digital buffer components.

16. A device according to claim 1, wherein said road curvature generator includes:
several curve curvature read-only-memories being a digital read-only-memory component which are addressed by the outputs of the curve distance counters and which supply digital curve curvature signals;

an equal number of digital-analog-converters being integrated digital/analog-converter components in which the digital signals are converted into the analog curve curvature voltages;

polarity inverters for all left curve curvature voltages; and a subtraction device in which all curve curvature voltages are added to the road curvature voltage.

17. A device as claimed in claim 1, wherein the output signals of said range wedge generators, the light spot pair generators, and the rectangle generators, the light spot pair generators, and the rectangle generators are written into a repetition memory being integrated digital random access memory components for the whole picture at renounciation of the comparators, and being read line by line.

* * * * *